United States Patent

Toh et al.

[11] Patent Number: 5,502,139
[45] Date of Patent: Mar. 26, 1996

[54] CROSS-LINKABLE POLYMERIC COMPOSITION

[75] Inventors: Huan K. Toh, Fullerton; Chong M. Kok, Flagstaff Hill, both of Australia

[73] Assignee: Sola International Holdings Ltd., South Australia, Australia

[21] Appl. No.: 426,480

[22] Filed: Apr. 20, 1995

Related U.S. Application Data

[63] Continuation of Ser. No. 151,820, Nov. 15, 1993.

[30] Foreign Application Priority Data

Nov. 16, 1992 [AU] Australia .................................. PL5864

[51] Int. Cl.$^6$ .................................................. C08F 236/22
[52] U.S. Cl. .................... 526/284; 526/286; 526/289; 526/301; 526/313; 526/323; 526/323.1; 526/323.2; 526/325; 528/373; 528/376
[58] Field of Search .................... 526/284, 301, 526/313; 528/373, 376

[56] References Cited

U.S. PATENT DOCUMENTS

| | | | |
|---|---|---|---|
| 4,663,412 | 5/1987 | Guillet | 526/284 |
| 4,912,185 | 3/1990 | Toh | 526/301 |
| 4,931,521 | 6/1990 | Matsuda | 526/286 |
| 5,034,433 | 7/1991 | Cohen | 523/400 |
| 5,191,055 | 3/1993 | Kanemura | 528/77 |
| 5,196,296 | 3/1993 | Watanabe | 430/288 |
| 5,270,439 | 12/1993 | Maruyama | 528/373 |
| 5,373,033 | 12/1994 | Toh | 522/96 |

FOREIGN PATENT DOCUMENTS

| | | | |
|---|---|---|---|
| 0421086A2 | 4/1991 | European Pat. Off. | |
| 4325508 | 11/1992 | Japan . | |
| 5009264 | 1/1993 | Japan | 526/284 |
| 175162 | of 1991 | United Kingdom . | |
| 428991 | of 1992 | United Kingdom . | |
| 015362 | of 1993 | United Kingdom . | |
| 131326 | of 1993 | United Kingdom . | |

*Primary Examiner*—Fred Zitomer
*Attorney, Agent, or Firm*—Burns, Doane, Swecker & Mathis

[57] ABSTRACT

A cross-linkable polymeric casting composition including a fluorene diacrylate or dimethacrylate monomer; and a comonomer including a polymerisable double bond.

12 Claims, No Drawings

CROSS-LINKABLE POLYMERIC COMPOSITION

This application is a continuation of application Ser. No. 08/151,820, filed Nov. 15, 1993.

The present invention relates to the manufacture of plastic optical articles such as video discs and ophthalmic lenses. The most widely used plastic ophthalmic lens material is polymerised diethylene glycol bis (allyl carbonate). This polymer has proved a satisfactory material for the manufacture of ophthalmic lenses because of a combination of features, including excellent transmission, resistance to discolouration, high strength and high impact resistance. The material has a reasonable abrasion resistance and can be coated to improve that resistance.

Fluorene acrylates and methacrylates are specialty resins used in electronic applications.

In Australian Patent 601,779, the entire disclosure of which is incorporated herein by reference, applicant describes a cross-linkable casting composition including at least polyoxyalkylene glycol diacrylate or dimethacrylate and at least one poly functional unsaturated cross-linking agent. Whilst the lenses produced from the prior art compositions provide advances in the art, difficulties may be encountered in certain applications. For example, difficulties may be encountered in some patients in fitting lenses made from such compositions. Eye discomfort, including eye fatigue problems, may be encountered. Moreover, such lenses have been found to be cosmetically unattractive.

Further in Australian Patent Application 75160/91, the entire disclosure of which is incorporated herein by reference, applicant describes a polyoxy alkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

Japanese Patent Application 244680 of 1989 to NEC Corporation discloses a resin composition including a fluorene epoxy acrylate prepolymer which may be used in the formation of electronic and optical parts.

Whilst optical articles formed from such compositions exhibit improved refractive index, certain high refractive index monomers used may exhibit unacceptable smell, toxicity, brittleness or low softening temperatures.

Accordingly, it is an object of the present invention to overcome, or at least alleviate, one or more of the difficulties related to the prior art.

Accordingly, the present invention provides a cross-linkable polymeric casting composition including a fluorene diacrylate or dimethacrylate monomer; and
a comonomer including a polymerisable double bond.

The crosslinkable polymeric casting composition according to the present invention may be utilised in the preparation of an optical article. The presence of the fluorene structure provides high refractive index plus good all round properties such as heat stability, abrasion resistance and impact strength. This may be achieved without the usual negative features of high index monomers such as smell, toxicity, brittleness or low softening temperatures.

By the term "high refractive index", as used herein, we mean a polymer having a refractive index of at least approximately 1.55, preferably 1.57 more preferably 1.60 or higher.

The fluorene diacrylate or dimethacrylate monomer may be of any suitable type. The fluorene diacrylate or dimethacrylate may be of the general formula

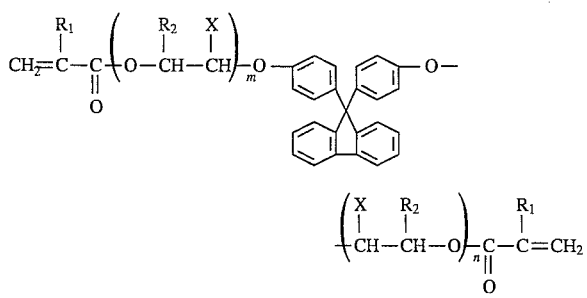

wherein
$R_1$=H or alkyl, preferably $CH_3$
$R_2$=H or alkyl, preferably $CH_3$
X=H or OH
m and n are integers provided that the sum of m and n is from 0 to 4

The fluorene monomer may be selected from a bisphenol fluorene dihydroxyacrylate (BFHA) or a bisphenol fluorene dimethacrylate (BFMA) or mixtures thereof.

The fluorene diacrylate or dimethacrylate monomer may be present in an amount suitable to provide a casting composition having a viscosity of not greater than approximately 300 cps at 25° C. The fluorene diacrylate or dimethacrylate monomer may be present in amounts of from approximately 2.5% to 50% by weight, preferably approximately 5 to 30% by weight, based on the total weight of the casting composition.

The polymerisable comonomer may be selected to improve the properties and/or processability of the cross-linkable polymeric casting composition. The polymerisable comonomer may be selected from any suitable type, e.g. methacrylates, acrylates, vinyls, vinyl ethers, allyls, aromatic olefins, ethers, polythiols, etc.

The polymerisable comonomer may be a low viscosity unsaturated comonomer. The low viscosity unsaturated comonomer may be of any suitable type. The low viscosity unsaturated comonomer may be selected from one or more of aromatic olefins, polyoxyalkylene glycol diacrylates or dimethacrylates, polymerisable bisphenol monomers capable of forming a homopolymer having a high refractive index of more than 1.55, urethane monomers having 2 to 6 terminal acrylic or methacrylic groups, and thiodiacrylate or dimethacrylate monomers.

The aromatic olefins may be selected from styrene, divinyl benzene and 3,9-divinyl-2,4,8,10-tetraoxaspiro [5.5]undecane (DTU). The aromatic olefins may be present in amounts of approximately 5 to 50% by weight.

The thiodiacrylate or dimethacrylates may be selected from bis(4-methacryloylthioethyl)sulfide (BMTES) and bis(4-methacryloylthiophenyl)sulfide (BMTS or TS). The thiodiacrylate may be present in amounts of from approximately 5 to 40% by weight, preferably 20 to 40% by weight.

The polyoxy alkylene glycol diacrylate or dimethacrylate compound according to the present invention may include ethylene oxide or propylene oxide repeating units in its backbone. A polyethylene glycol dimethacrylate is preferred. One suitable material is that sold under the trade name NKESTER 9G by Shin Nakamura. Alternatively, an NK Ester 6G, 4G or 14G may be used.

The polyoxy alkylene glycol diacrylate or dimethacrylate component may be present in amounts of from approximately 5% by weight to 60% by weight based on the total weight of the casting composition. The diacrylate or dimethacrylate component is preferably present in amounts of approximately 15% by weight to 55% by weight, more preferably 20 to 45% by weight.

The high index bisphenol monomer component in the cross-linkable casting composition may be selected from: dimethacrylate and diacrylate esters of bisphenol A; dimethacrylate and diacrylate esters of 4,4'bishydroxy-ethoxy-bisphenol A and the like.

A preferred high index bisphenol compound is a bisphenol A ethoxylated dimethacrylate. A bisphenol A ethoxylated dimethacrylate sold under the trade designation ATM20 by Ancomer or Bis GMA by Freeman Chemicals have been found to be suitable. Halogenated high index bisphenol compounds which may be used include those sold under the trade designation and NK Ester 534M by Shin Nakamura.

The high index bisphenol monomer may be present in amounts of from approximately 10 to 60% by weight, preferably 20 to 55% by weight, based on the total weight of the casting composition.

As stated above, the cross-linkable polymeric casting composition may include a urethane monomer having 2 to 6 terminal acrylic and/or methacrylic groups. Suitable materials falling within this definition include materials supplied under the trade names U-4H, U-4HA and U-6HA by Shin Nakamura, NF-201 and NF-202 by Mitsubishi Rayon. These monomers are included to improve physical toughness without causing the lens material to become too brittle. Impact resistance is improved without adversely affecting abrasion resistance.

The urethane monomer may be present in any suitable amount to provide a desired level of hardness. The urethane monomer may be present in amounts of from approximately 2.5% to approximately 25% by weight, preferably 5% to 20% by weight, based on the total weight of the casting composition.

In a preferred aspect of the present invention the cross-linkable polymeric coating composition may further include at least one poly-functional unsaturated cross-linking agent.

The poly functional unsaturated cross-linking agent according to the present invention may be a tri- or tetra-functional vinyl, an acrylic or methacrylic monomer. The cross-linking agent may be a snort chain monomer for example trimethylol propane trimethacrylate, pentaerythritol triacrylate or tetracrylate, or the like. Other polyfunctional cross-linking agents which may be used include NK Ester TMPT, NK Ester A-TMPT, NK Ester A-TMM-3, NK Ester A-TMMT, di-trimethylol propane tetraacrylate, trimethylolpropane triacrylate, pentaerythritrol tetramethacrylate, dipentaerythritol monohydroxypenta acrylate, pentaerythritol triacrylate, ethoxylated trimethylolpropane triacrylate, ethoxylated trimethylol- propane trimethacrylate.

A material sold under the trade name SR-454 which is an ethoxylated trimethylol propane triacrylate has been found to be suitable.

The polyfunctional unsaturated cross-linking agent may be present in amounts of from approximately 5 to 45% by weight, preferably approximately 30 to 40% by weight based on the total weight of the casting composition.

The cross-linkable casting composition may further include a coreactant including a polythiol.

The polythiol may be selected from the group consisting of (a) Pentaerythritol Tetrakis (3-mercapto-propionate) [PTMP ]

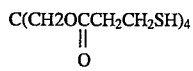

(b) Trimethylolpropane Tris (3-mercaptopropionate) [TTMP]

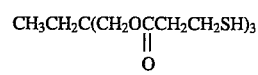

(c) 4-mercaptomethyl-3,6-dithia-1,8-octanedithiol [MDO]

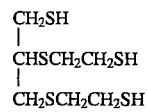

(d) Pentaerythritol Tetrakis (3-mercaptoacetate) [PTMA ]

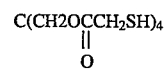

(e) Trimethylolpropane Tris (3-mercaptoacetate) [TTMA]

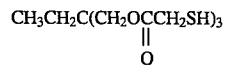

(f) 4-t-butyl-1,2-benzenedithiol

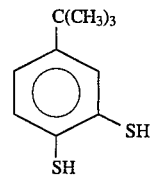

(g) 2-mercaptoethylsulfide $HSCH_2CH_2SCH_2CH_2SH$
(h) 4,4'-thiodibenzenethiol

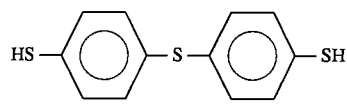

(i) benzenedithiol

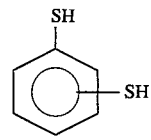

(j) Glycol Dimercaptoacetate

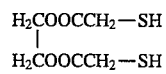

(k) Glycol Dimercaptopropionate Ethylene bis(3-Mercaptopropionate)

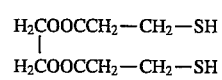

(l) Polyethylene Glycol Dimercaptoacetates

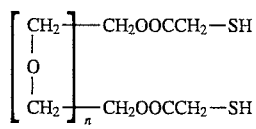

(m) Polyethylene Glycol Di(3-Mercaptopropionates)

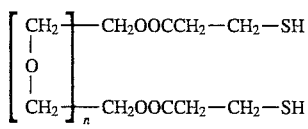

The thiol compound may be present in amounts from 0 to approximately 50% by weight.

The cross-linkable casting composition according to the present invention may further include an initiator. The initiator may be a heat and/or ultraviolet (U.V.) initiator.

The compositions are preferably cured by a combination of UV radiation and heat. The combination of UV radiation and heat may reduce the possibility of incomplete curing for example due to the phenomenon known as "radical trapping".

The composition, with the addition of approximately 0.2 to 2.0% by weight of cross-linking initiator may be exposed to UV radiation for between 0.5 and 10 seconds.

Any commercially viable UV curing system may be used. We have used a Fusion System with microwave driven lamps. A number of fusion bulbs with different output Spectra may be considered. Presently we prefer the "D" bulb and the "V" bulb.

One source we have found satisfactory is a 10 inch, 300 watt/inch mercury lamp. The mould assembly is then heated to 100° C. for one hour or the lens may be removed from the assembly and heated in air for about one hour at 100° C. This means that fully cured lenses can be manufactured, if desired, in about one hour. Heat curing can also be used without any use of U.V. radiation.

Typically 2–4 passes under the UV lamps plus an hour of heat treatment at 100° C. completes the cure.

Any suitable UV initiator may be used. An initiator available under the trade designation Irgacure 184 has been found to be satisfactory. More than one curing agent may be present. It has been possible to operate with a relatively low level of initiator of between approximately 0.05 and 0.25% by weight.

A range of photoinitiators available commercially can be used, depending on sample thickness, type of UV lamp used and the absorption wavelength of the monomer mix.

The following photoinitiators have been found to be suitable.
Alcolac Vicure 10—isobutyl benzoin ether
Alcolac Vicure 30—isopropyl benzoin ether
Alcolac Vicure 55 (V55)—methyl phenyl glyoxylate
Cyracure UV1-6974 (cationic photoinitiator) Triaryl sulfonium hexafluoroantimonate
Lucirin TPO (radical photoinitiator) 2,4,6-Trimethylbenzoyldiphenylphosphine oxide
Vicure 55 (radical photoinitiator) methyl phenylglyoxylate benzoic acid Initiator may be a single component or combination of initiator components.

Additionally, combination of photoiniator mixtures or photoinitiator mixtures with a heat induced free radical initiator such as peroxides, peroxypercabonates or an azo compound may also be employed.

As an alternative to photo curing a heat curing initiator may be used, for example 1,1 di-tert butyl peroxy-3,3,5-trimethylcyclohexane or secondary isopropyl percarbonate.

Other additives may be present which are conventionally used in casting compositions such as inhibitors, dyes, UV stabilisers and materials capable of modifying refractive index. Mould release agents can be added but they are in general not required with the compositions used in the method of the present invention. Such additives may include:

UV Absorbers including
Ciba Geigy Tinuvin P—2(2'-hydroxy-5'methyl phenyl) benzotriazole
Cyanamid Cyasorb UV 531 -2-hydroxy-4-n-octoxybenzophenone
Cyanamid Cyasorb UV5411-2(2-hydroxy-5-t-octylphenyl)benzotriazole
Cyanamid UV 2098—2 hydroxy-4-(2-acryloyloxyethoxy) benzophenone
National Starch and Chemicals Permasorb MA—2 hydroxy-4-(2 hydroxy-3- methacryloxy)propoxy benzophenone
Cyanamid UV24—2,2'-dihydroxy-4-methoxybenzophenone
BASF UVINUL 400—2,4 dihydroxy-benzophenone
BASF UVINUL D-49—2,2'-dihydroxy-4,4'-dimethoxybenzophenone
BASF UVINUL D-50—2,2', 4,4'tetrahydroxy benzophenone
BASF UVINUL D-35-ethyl-2-cyano-3,3-diphenyl acrylate
BASF UNINYL N-539-2-ethexyl-2-cyano-3,3-diphenyl acrylate
Ciba Geigy Tinuvin 213
Hindered amine light stabilizers (HALS), including
Ciba Geigy Tinuvin 765/292—bis (1,2,2,6,6-pentamethyl-4-piperidyl)sebacate
Ciba Geigy 770—bis (2,2,6,6-tetramethyl-4-piperidinyl) sebacate
Antioxidants including
Ciba Geigy Irganox 245—triethylene glycol-bis-3-( 3-tert-butyl-4-hydroxy-5-methyl phenyl)propionate
Irganox 1010 -2,2-bis[[3-[3,4-bis(1,1-dimethylethyl)- 4-hydroxyphenyl]-1-oxopropoxy]methyl]-1,3propanediyl 3,5-bis(1,1-dimethyl ethyl)-4-hydroxy benzene propanoate
Irganox 1076—octadecyl 3-(3',5'-di-tert-butyl(-4'-hydroxyphenyl) propionate
Anticolouring agents including
Triphenyl phosphine
9, 10 dihydro-9-oxa-10-phosphaphenanthrene-1-oxide
Cure modifiers including
Dodecyl mercaptan
Butyl mercaptan
Thiophenol
Nofmer from Nippon Oils and Fats
Q1301 from waco Other monomeric additives can be present in amounts up to 10% by weight as diluents, and include monomers such as methacrylic acid, vinyl silanes, methyl allyl, hydroxy ethyl, methacrylate. Other monomeric additives may be included to improve processing and/or material properties, these include:
methacrylic acid, maleic anhydride, acrylic acid
adhesion promoters/modifiers such as Sartomer 9008, Sartomer 9013, Sartomer 9015 etc.
dye-enhancing, pH-adjusting monomers like Alcolac SIPOMER 2MIM
a charge-reducing cationic monomer to render the
material more antistatic, example Sipomer Q5-80 or Q9-75 hydrophobic comonomers: Shin Nakamura NPG, P9-G etc. to reduce the water adsorption of the material
viscosity modifiers Accordingly, in a preferred aspect of the present invention the cross-linkable polymeric casting composition may further include
at least one aliphatic glycol dimethacrylate or diacrylate.

The aliphatic glycol dimethacrylate or diacrylate may function to reduce the viscosity of the composition and thus improve the processing characteristics of the composition.

An ethylene, propylene, butylene or pentylene diacrylate or methacrylate may be used. A butylene glycol dimethacrylate is preferred. One suitable material is that sold under the trade designation NK ester BD by Shin Nakamura.

A neopentyl glycol dimethactylate may be used. One suitable material is that sold under the trade designation NK ester NPG by Shin Nakamura.

The aliphatic glycol dimethacrylate or diacrylate may be present in amounts of approximately 1 to 10% by weight, preferably 2.5 to 5% by weight based on the total weight of the casting composition.

In a further aspect of the present invention there is provided a polymeric article formed from a cross linkable casting composition as described above. The polymeric article may be an optical article. The optical article may provide characteristics equal to or greater than those achievable with articles made from diethylene glycol bis(allyl carbonate) but with a considerably reduced cure time and substantially increased throughput. The optical article may be further characterised by having an increased refractive index without degrading other important lens properties such as density, abrasion, impact, colour, and rigidity (hardness and heat resistance).

The overall refractive index may be in the mid to high refractive index range of from approximately 1.51 to 1.59, preferably 1.53 to 1.57.

The optical articles prepared by the method of this invention include camera lenses, ophthalmic lenses and video discs.

The casting composition may be formed into a suitable article by mixing in a convenient vessel the components making up the material, and then adding the curing catalyst and/or photo-initiator. The mixed material is then degassed or filtered. As the curing time is substantially reduced the casting process may be undertaken on a continuous or semi-continuous basis.

The present invention will now be more fully described with reference to the accompanying examples. It should be understood, however, that the description following is illustrative only and should not be taken in any way as a restriction on the generality of the invention described above.

EXAMPLE 1

A cross-linkable casting composition having the following components was prepared

|  | % by weight |
|---|---|
| 9 G (polyethylene glycol dimethacrylate) | 45% |
| SR-454 (ethoxylated trimethyl propanetriacrylate) | 35% |
| U4HA (urethane tetracrylate) | 15% |
| BFHA (bisphenolfluorene dihydroxyacrylate) | 5% |

The monomer mix was prepared in a beaker together with 0.2% V55 as the U.V. initiator.

The casting material was used to fill the space between a pair of glass moulds separated by a plastic gasket at their periphery. The mould was then passed 4 times under a U.V. lamp. This was followed by a 1 hour extended cure at 100° C.

EXAMPLES 2–13

Example 1 was repeated under similar conditions with monomer mixes as designated in Table 1 below. The results achieved are also given in Table 1. Satisfactory lenses were achieved in Examples 1, 3, 4, 5, 8, 9, 10, 12, 13 and 14.

TABLE 1

| | | Examples of Using BFHA as a Casting Material | | | | | |
|---|---|---|---|---|---|---|---|
| Ex. | Casting Material | S.G. | R.I. | Impact (a) | Y.I. | Taber Abrasion (b) | Barcol Hard. |
| 1. | 9G/S454/U4HA/BFHA 45/35/15/5 | 1.23 | 1.512 | Good | 1.0 | Good | 19 |
| 2. | 9G/S454/U4HA 45/35/20 (Comparative) | 1.23 | 1.507 | Good | 1.0 | Good | 17 |
| 3. | 9G/S454/U4HA/BFHA 45/35/10/10 | 1.23 | 1.517 | Good | 1.0 | Good | 20 |
| 4. | 9G/S454/U4HA/BFHA 45/35/5/15 | 1.23 | 1.522 | Good | 0.9 | Good | 17 |
| 5. | 9G/S454/BFHA 45/35/20 | 1.23 | 1.529 | Good | 1.0 | Good | 15 |
| 6. | 9G/U4HA/ATM20 45/5/50 (Comparative) | 1.21 | 1.537 | Good | 1.0 | Good | 23 |
| 7. | 9G/U4HA/ATM20 35/5/60 (Comparative) | 1.11 | 1.543 | Poor | 1.4 | Poor | 28 |
| 8. | 9G/U4HA/ATM20/BFHA 45/5/40/10 | 1.22 | 1.542 | Good | 1.0 | Good | 24 |
| 9. | 9G/U4HA/ | 1.23 | 1.549 | Good | 1.1 | Good | 25 |

TABLE 1-continued

Examples of Using BFHA as a Casting Material

| Ex. | Casting Material | S.G. | R.I. | Impact (a) | Y.I. | Taber Abrasion (b) | Barcol Hard. |
|---|---|---|---|---|---|---|---|
|  | ATM20/BFHA 45/5/30/20 |  |  |  |  |  |  |
| 10. | 9G/U4H4/ ATM20/BFHA 45/5/20/30 | 1.23 | 1.554 | Good | 1.1 | Good | 27 |
| 11. | 9G/TS/S454/ ATM20 20/30/10/40 (Comparative) | 1.24 | 1.564 | Good | 2.1 | Good | 35 |
| 12. | 9G/TS/S454/ ATM20/BFHA 20/30/10/30/10 | 1.24 | 1.570 | Good | 2.1 | Good | 38 |
| 13. | 9G/TS/S454/ ATM20/BFHA 20/30/10/20/20 | 1.25 | 1.576 | Good | 2.1 | Good | 40 |
| 14. | 9G/TS/S454/ ATM20/BFHA 20/30/10/10/30 | 1.25 | 1.582 | Good | 2.1 | Good | 42 |

(a) Good = passed FDA dropball tests (2.00 mm planos)
(b) Good = similar to or better than CR-39

DESCRIPTION OF TESTS

Taber

Apparatus used to assess the abrasion resistance of lens materials. It involves the use of an abrasive wheel rubbed across a lens surface. Degree of abrasion is assessed according to the level of haze induced by wear.

Barcol Hardness

Measure of the hardness of a lens material. A fixed force is applied to a needle point. The depth of penetration indicates the degree of hardness.

Yellowness Index

A measure of the degree of yellowness as assessed by the Gardiner Colorimeter Model XL835.

Examples 1, 3, 4 and 5 should be compared with Example 2 showing how RI can be improved by using BFHA.

Similarly, Examples 8, 9 and 10 should be compared with Example 7, and Examples 12, 13 and 14 should be compared with Example 11.

Refractive Index (R.I.)

This is measured on the Abbe Refractometer.

Specific Gravity (S.G.)

This is measured by weighing the material in air and water, and applying Archimede's Principle.

Impact Strength

This is determined by a drop-ball method according to ANSI standards.

Abbreviations
9G polyethylene glycol dimethacrylate
SR-454 ethoxylated trimethyl propanetriacrylate
U4HA urethane tetracrylate
BFHA bisphenolfluorene dihydroxyacrylate
ATM20 bisphenol A ethoxylated dimethacrylate
TS bis(4-methacryloylthiophenyl)sulfide Finally, it is to be understood that various other modifications and/or alterations may be made without departing from the spirit of the present invention as outlined herein.

We claim:

1. A cross-linkable polymeric casting composition suitable for use in the formation of a transparent optical article having a high refractive index in the range of 1.55 to 1.60 comprising:

approximately 5% to 30% by weight based on the total weight of the casting composition of a fluorene diacrylate or dimethacrylate monomer selected from monomers of the general formula

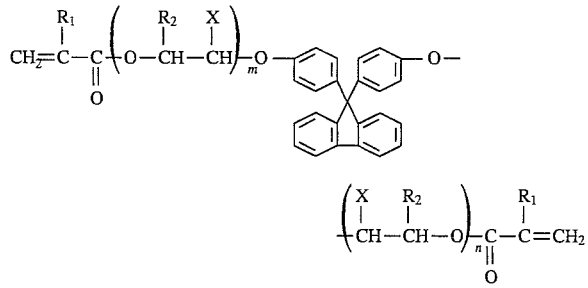

wherein
$R_1$=H or alkyl,
$R_2$=H or alkyl,
X=H or OH, and
m and n are integers provided that the sum of m and n is from 0 to 4; approximately
5% to 60% by weight of a polyoxyalkylene glycol diacrylate or dimethacrylate; and
at least one comonomer selected from the group consisting of approximately 2.5% to 25% by weight of a urethane monomer having 2 to 6 terminal acrylic and/or methacrylic groups; approximately 5 to 45% by weight of a polyfunctional unsaturated cross-linking agent selected from the group consisting of tri- and tetrafunctional vinyls, and acrylic and methacrylic monomers; approximately 10 to 60% by weight of a bisphenol monomer selected from the group consisting of dimethacrylate and diacrylate esters of bisphenol A, dimethacrylate and diacrylate esters of 4,4'bishydroxyethoxy-bisphenol A and mixtures thereof; and approximately 5 to 40% by weight of a thiodiacrylate or thiodimethacrylate; or mixtures thereof.

2. The casting composition according to claim 1, wherein the diacrylate or dimethacrylate compound is a polyethylene glycol dimethacrylate.

3. The casting composition according to claim 1, wherein said comonomer is a tetracrylic urethane monomer.

4. The casting composition according to claim 1, wherein said comonomer is an ethoxylated trimethylol propane triacrylate.

5. The casting composition according to claim 1, wherein said comonomer is a bisphenol A ethoxylated dimethacrylate.

6. The casting composition according to claim 1, wherein the comonomer is bis(4-methacryloylthioethyl)sulfide or bis(4-methacryloylthiophenyl)sulfide.

7. The cross-linkable polymeric casting composition according to claim 1 further including a coreactant comprising a polythiol selected from the group consisting of pentaerythritol tetrakis (3-mercapto-propionate), trimethylolpropane tris (3-mercaptopropionate), 4-mercaptomethyl-3,6-dithia-1,8-octanedithiol, pentaerythritol tetrakis (3-mercaptoacetate), trimethylolpropane tris (3-mercaptoacetate), 4-t-butyl-1,2-benzenedithiol, 2-mercaptoethylsulfide, 4,4'-thiodibenzenethiol, benzenedithiol, glycol dimercaptoacetate, glycol dimercaptopropionate ethylene bis(3-mercaptopropionate), polyethylene glycol dimercaptoacetates and polyethylene glycol di(3-mercaptopropionates).

8. A cross-linkable polymeric casting composition suitable for use in the formation of a transparent optical article having a high refractive index in the range of 1.55 to 1.60 comprising:

approximately 5% to 30% by weight based on the total weight of the casting composition of a fluorene diacrylate or dimethacrylate monomer selected from monomers of the general formula

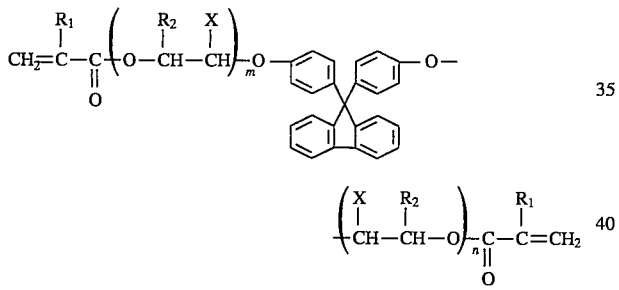

wherein
$R_1$=H or alkyl,
$R_2$=H or alkyl,
X=H or OH
m and n are integers provided that the sum of m and n is from 0 to 4;
approximately 5% to 60% by weight of a polyoxyalkylene glycol diacrylate or dimethacrylate; and
a coreactant comprising a polythiol selected from the group consisting of pentaerythritol tetrakis (3-mercaptopropionate), trimethylolpropane tris (3-mercaptopropionate), 4-mercaptomethyl-3,6-dithia-1,8-octanedithiol, pentaerythritol tetrakis (3-mercaptoacetate), trimethylolpropane tris (3-mercaptoacetate), 4-t-butyl-1,2-benzenedithiol, 2-mercaptoethylsulfide, 4,4'-thiodibenzenethiol, benzenedithiol, glycol dimercaptoacetate, glycol dimercaptopropionate ethylene bis(3-mercaptopropionate), polyethylene glycol dimercaptoacetates and polyethylene glycol di(3-mercaptopropionates).

9. A cross-linkable polymeric casting composition comprising approximately 5 to 30% by weight, based on the total weight of the casting composition, of a fluorene diacrylate or dimethacrylate monomer;

approximately 20 to 45% by weight of a polyethylene glycol dimethacrylate;

approximately 5 to 20% by weight of a tetracrylic urethane monomer; and approximately 30 to 40% by weight of an ethoxylated trimethylol propane triacrylate.

10. A cross-linkable polymeric casting composition comprising approximately 5 to 30% by weight, based on the total weight of the casting composition, of a fluorene diacrylate or dimethacrylate monomer;

approximately 20 to 45% by weight of a polyethylene glycol dimethacrylate;

approximately 5 to 20% by weight of a tetracrylic urethane monomer;

approximately 30 to 40% by weight of an ethoxylated trimethylol propane triacrylate; and approximately 20 to 55% by weight of a high refractive index bisphenol A ethoxylated dimethacrylate.

11. A cross-linkable polymeric casting composition comprising approximately 5 to 30% by weight, based on the total weight of the casting composition, of a fluorene diacrylate or dimethacrylate monomer;

approximately 20 to 45% by weight of a polyethylene glycol dimethacrylate;

approximately 5 to 20% by weight of a tetracrylic urethane monomer;

approximately 30 to 40% by weight of an ethoxylated trimethylol propane triacrylate;

approximately 20 to 55% by weight of a high index bisphenol A ethoxylated dimethacrylate; and approximately 20 to 40% by weight of a thiodimethacrylate selected from bis(4-methacryloylthioethyl)sulfide and bis(4-methacryloyl-thiophenyl)sulfide.

12. A polymeric optical article formed from a casting composition according to claim 11 and having a refractive index in the range of 1.51 to 1.60.

* * * * *